United States Patent
Eymann

(10) Patent No.: US 8,233,562 B2
(45) Date of Patent: Jul. 31, 2012

(54) SYSTEM AND METHOD FOR CLOSED-LOOP SIGNAL DISTORTION

(75) Inventor: Steven Eymann, Phoenix, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 1002 days.

(21) Appl. No.: 12/202,513

(22) Filed: Sep. 2, 2008

(65) Prior Publication Data

US 2009/0052507 A1 Feb. 26, 2009

Related U.S. Application Data

(60) Provisional application No. 60/970,239, filed on Sep. 5, 2007.

(51) Int. Cl.
*H04L 27/00* (2006.01)
(52) U.S. Cl. ........................................ 375/295; 375/229
(58) Field of Classification Search .................. 375/229, 375/295
See application file for complete search history.

(56) References Cited

U.S. PATENT DOCUMENTS

| | | | |
|---|---|---|---|
| 5,625,893 A | 4/1997 | Kahn | |
| 5,860,057 A * | 1/1999 | Ishida et al. | 455/12.1 |
| 6,246,865 B1 | 6/2001 | Lee | |
| 6,252,912 B1 * | 6/2001 | Salinger | 375/278 |
| 6,266,517 B1 | 7/2001 | Fitzpatrick et al. | |
| 6,751,266 B1 | 6/2004 | Danielsons | |
| 6,873,860 B2 | 3/2005 | Hildebrand et al. | |
| 6,879,641 B2 | 4/2005 | Unger | |
| 6,889,060 B2 | 5/2005 | Fernando et al. | |
| 6,957,044 B2 | 10/2005 | Beech et al. | |
| 2004/0028411 A1 | 2/2004 | Londono | |
| 2004/0166800 A1 * | 8/2004 | Sun | 455/12.1 |
| 2005/0094752 A1 | 5/2005 | Frahm et al. | |
| 2007/0082617 A1 | 4/2007 | McCallister | |
| 2007/0153884 A1 | 7/2007 | Balasubramanian et al. | |

* cited by examiner

Primary Examiner — Chieh M. Fan
Assistant Examiner — Freshteh N Aghdam
(74) Attorney, Agent, or Firm — Booth Udall, PLC

(57) ABSTRACT

The system and method disclosed herein provide for closed-loop compensation of significant amplitude versus frequency group delay distortion that may be introduced into a satellite communication system signal by the uplink equipment and a satellite repeater equipment. One or more equalizers can be configured to automatically assess distortion at the downlink receiver, automatically calculate the necessary pre-distortion coefficients and provide them to a modulator that pre-distorts the uplink signal to thereby cancel the distortion.

19 Claims, 8 Drawing Sheets

SYSTEM AND METHOD FOR CLOSED-LOOP SIGNAL DISTORTION

CROSS REFERENCE TO RELATED APPLICATIONS

This document claims the benefit of the filing date of U.S. Provisional Patent Application 60/970,239 to Eymann entitled "System and Method for Closed-Loop Signal Distortion," which was filed on Sep. 5, 2007, the disclosure of which is hereby incorporated herein by reference.

BACKGROUND

Satellite communication systems rely on transponders within a satellite to receive the signal sent from a ground station, shift the frequency and filter and amplify it before it is sent back to the earth to the receive station(s). Each transponder has a fixed bandwidth. For example, many satellites have a transponder spacing of 40 MHz with a bandwidth of around 36 MHz. Conventional transponders receive weak signals, amplify the signal strength, translate it to the downlink frequency, filter unwanted sidebands and then amplify the signal again to send the amplified signal to the receiver site. A side effect of using filters and amplifiers is the introduction of amplitude and group delay variation versus frequency, which limits the usable bandwidth. These effects happen in the uplink equipment as well, but usually to a lesser degree.

FIG. 1 is a schematic representation of a conventional satellite communication system including a transmitter system (left), a satellite repeater 150 and a receiver system (right). The transmitter system receives a digital data input 100 after it passes through digital baseband processing 110. The signal is directed to modulator 120 which modulates the digital data onto a carrier. Modulated data signal is then converted to the appropriate frequency and filtered by upconverter 130. The data signal is then directed to High Power Amplifier ("HPA") 140 to amplify the communication signal prior to transmitting the signal from the transponder system antenna 148 to the satellite repeater 150.

The signal is received at the satellite repeater 150 as an uplink signal received by antenna 152. In a typical satellite repeater 150, the uplink signal is processed through LNA 154, down converter 155, filter 156, amplifier 158 and filter 159 before its transmission through antenna 153 to the receiver system antenna 172 as a downlink signal.

The downlink signal received through antenna 172 is direct downlinked to a LNB converter 174 which amplifies the signal but inherently adds thermal noise. The data signal is then input to demodulator 178 at L-band. The demodulator recovers the originally-transmitted data to provide digital data output 180. Alternatively, the receiving system 170 could comprise a low noise amplifier ("LNA"), radio frequency ("RF") to intermediate frequency ("IF") down converter and a demodulator that accepts the IF for demodulation.

Any part of the signal transfer chain from transponder system to satellite repeater to receiver system that imparts a change in amplitude or group delay versus frequency will cause a degradation of the signal. These changes cause a degradation in performance of the demodulation process, and thus, a less reliable system. The largest contributors to the degradation of the signal are caused by the group delay of the upconverter and filter 130 and the satellite repeater 150 which adds group delays at each of its filters 156 and 159. Various parts of the transmitter system and satellite repeater 150 conventionally introduce significant amplitude distortion as well.

Most commonly, the amplitude and phase delay distortion is minimized through the bandwidth of the signal being kept narrow enough to occupy only a limited portion of the available transponder bandwidth where the group delay is sufficiently small to only minimally affect the signal. Another common approach is to place an analog equalizer in the ground station uplink that is tuned to compensate for this group delay characteristic. Analog equalizers comprise several sections of all-pass filters that cannot remove the excess delay at the edges of the transponder bandwidth, but rather add additional delay in the middle. This is accomplished in a piecewise method by manually tuning all the sections while monitoring the downlink with very expensive test equipment. To tune the various sections is an art rather than a science. It is impossible to completely equalize the channel with this device. Significant residual group delay or amplitude flatness issues will remain and are subject to the typical drift of analog components.

SUMMARY OF THE DISCLOSURE

Particular implementations of a satellite communication system disclosed herein address amplitude and group delay versus frequency correction requirements and other limitations by using a digital receiver associated with the modulator for measuring transmitter and repeater amplitude and group delay versus frequency distortions. The characteristics of these distortions are fed to the modulator which calculates an inverse response and, using a complex FIR and IIR filter structure, compensates for the distortions. According to a particular implementation of the disclosure, the digital equalization is performed in the digital domain within the modulator and, hence, is not dependent on the output frequency of the modulator.

In another implementation of the disclosure a digital receiver is located at the receive end of the communication link for measuring transmitter and repeater distortions. The characteristics of these distortions are communicated over an external communications link to the modulator which then calculates an inverse response and, using a complex FIR and IIR filter structure and compensates for the distortions. According to another implementation of the disclosure, the digital equalization is performed in the digital domain within the modulator and hence is not dependent on the output frequency of the modulator.

According to yet another implementation of the disclosure, the pre-distortion coefficients are calculated ahead of time and uploaded to the modulator to modify the spectral output of the system to compensate for the distortion. According to another implementation of the disclosure, the digital equalization is performed in the digital domain within the modulator and, hence, is not dependent on the output frequency of the modulator.

BRIEF DESCRIPTION OF THE DRAWINGS

These and other implementations of the disclosure will be discussed with reference to the following exemplary and non-limiting drawings in which similar elements are numbered similarly, and in which.

DETAILED DESCRIPTION

Figure 1:
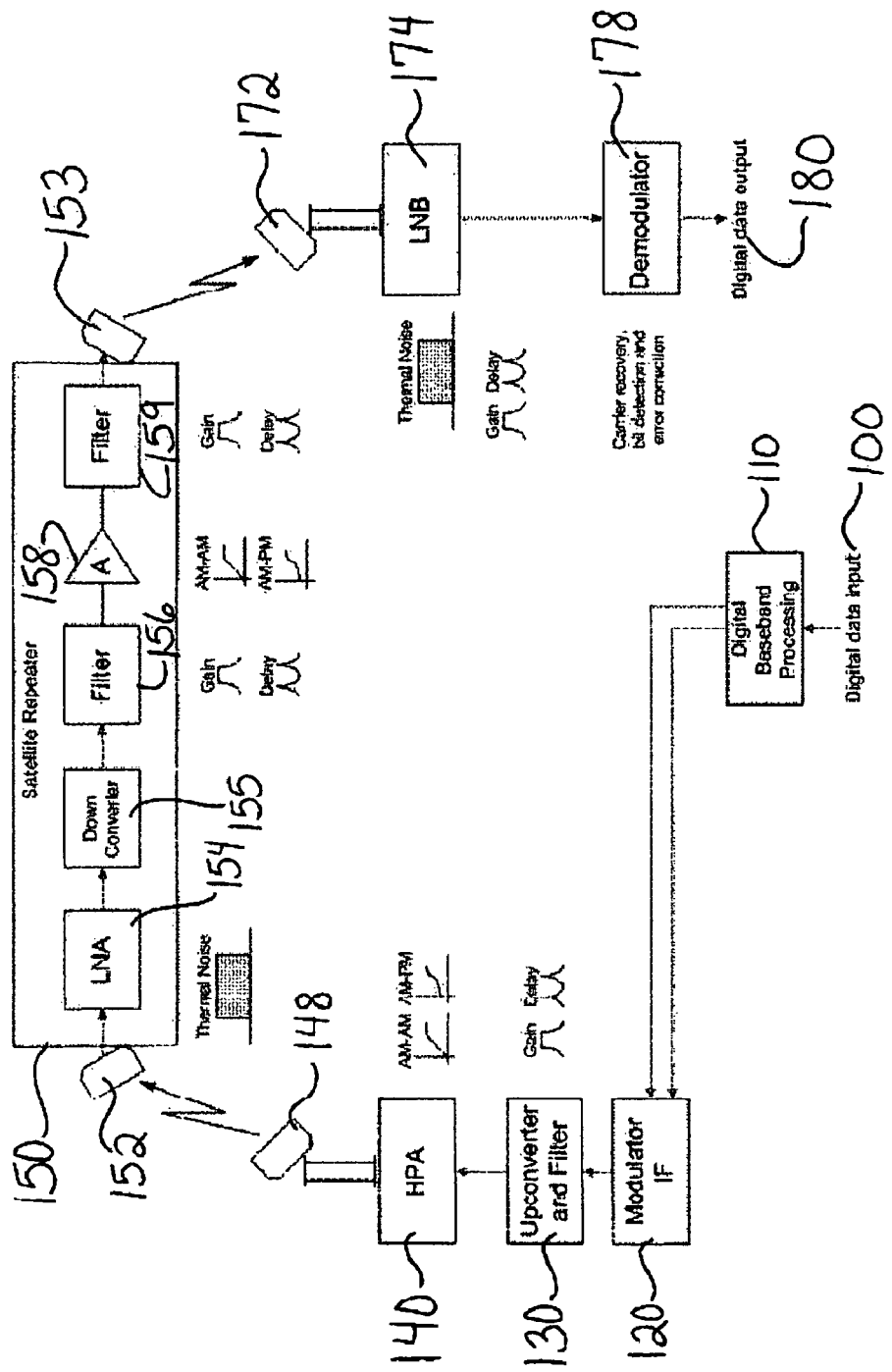
FIG. 1 is a schematic representation of a conventional satellite communication system.
Figure 2:
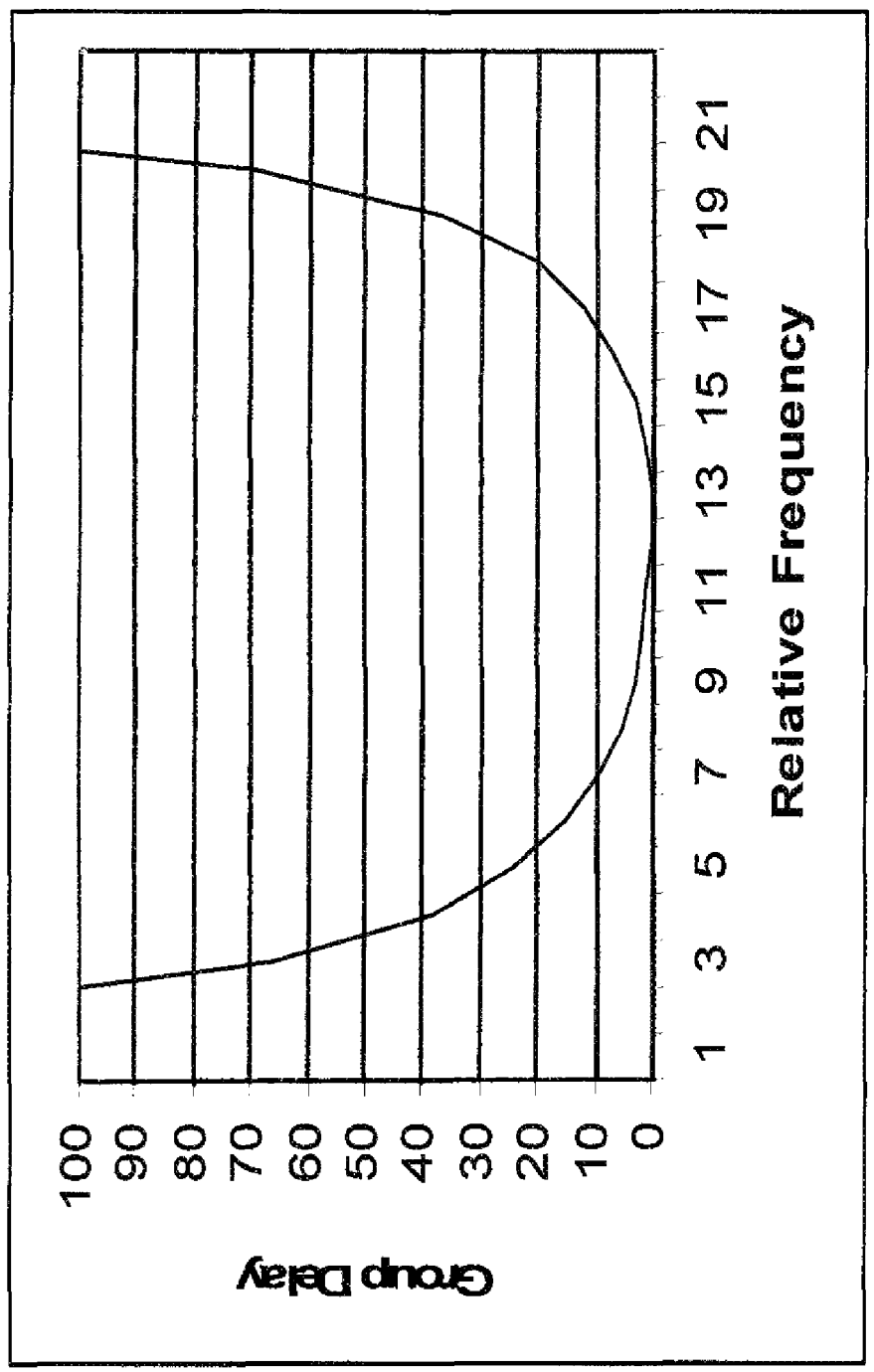
FIG. 2 is a graph illustrating group delay versus relative frequency of a conventional transponder.

The amplitude and phase delay distortions of conventional satellite communication systems effectively limit the useable bandwidth on a transponder system at its minimum and maximum frequencies. FIG. 2 illustrates a representation of the group delay versus relative frequency of a conventional system. This forces large carriers to use only the center portion of the frequency range of the transponder. A conventional transponder system uses only a portion of its available bandwidth capacity because of these limitations. In fact, a conventional transponder system typically uses only 80% of its total capacity.

Although the non-limiting implementations illustrated in this disclosure are particularly directed toward satellite communication examples, the principles, techniques and systems disclosed may also readily be applied to use in other wireless communication systems, microwave network systems and cable/optical communication systems by those of ordinary skill in the art from the disclosure provided.

Figure 3:
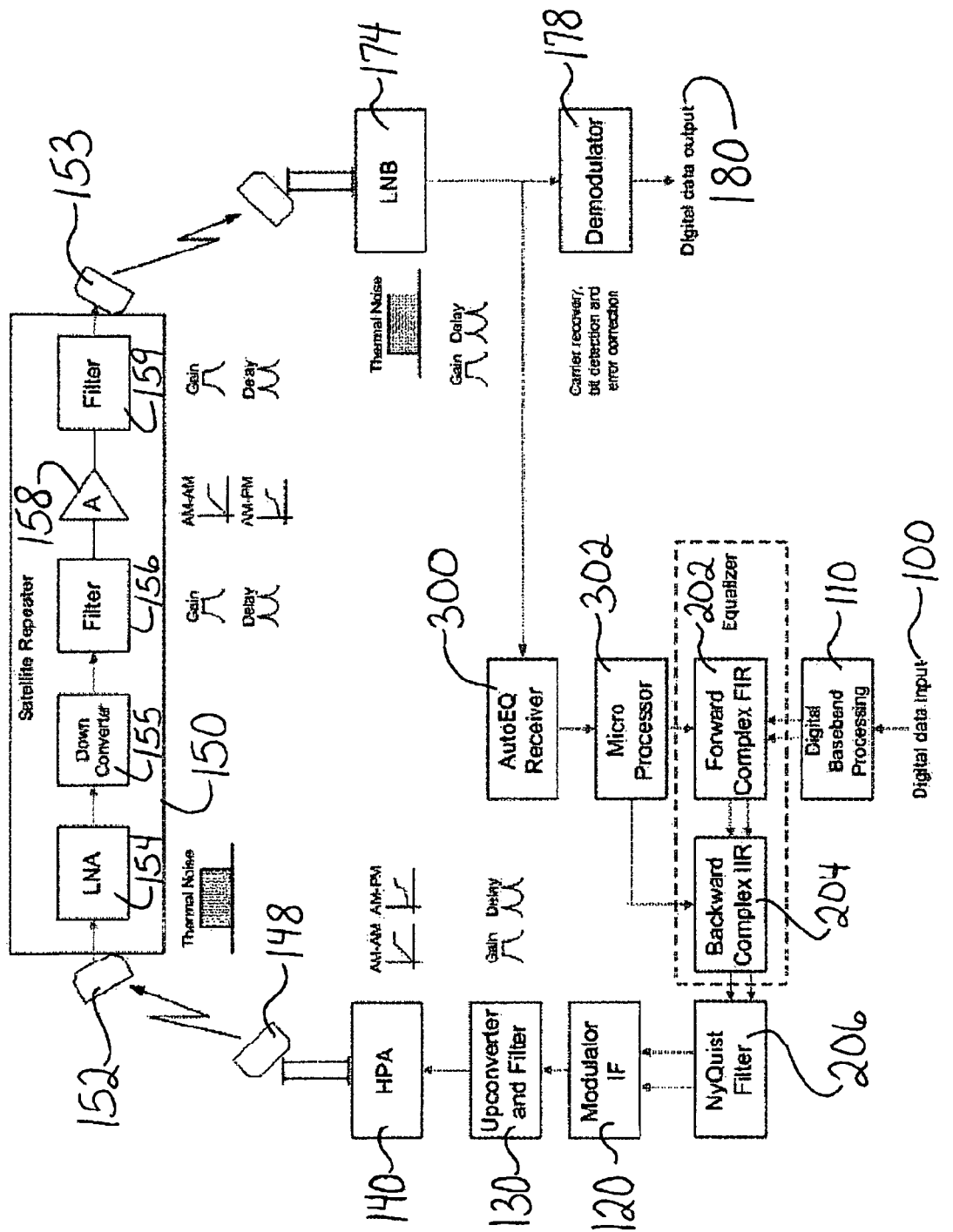
FIG. 3 is a schematic representation of a satellite communication system according to a particular implementation of the disclosure.

FIG. 3 is a block diagram of a particular, non-limiting example of an equalizer circuit 200, particular implementations of which may be referred to as an automatic equalizer ("AutoEQ") throughout this disclosure. Equalizer 200 addresses amplitude and group delay versus frequency correction by pre-filtering the digital data input signal 100 with an opposite phase and amplitude as the known transponder system. Because the pre-distortion step is performed at baseband in the digital processing circuitry, it can effectively eliminate the negative effects of the amplifier and filter distortion resulting in a carrier free of distortion at any output IF frequency.

The amplitude and group delay versus frequency filter function of a satellite communication system can be described by the time impulse response of the filter (or combination of filters). Once this characteristic is known, there are standard equalizer techniques to compensate for it. These include, by non-limiting example, minimum mean squared error (MMSE), least mean square (LMS), decision feedback (DFE), and the like. In particular implementations the equalizer, especially those using DFE type techniques, may be employed in the receiver. Generally speaking, implementations applying DFE type equalizer techniques in the receiver are rather simple; relying on the DFE approach to cancel the inter-symbol interference ("ISI") created by the non-constant group delay as opposed to generating the inverse response as is the case for the transmit equalizer. Additionally, if the communication channel causes significant degradation of the signal and hence requires substantial correction, the receive equalizer will add noise to the signal and cause degradation from a lower signal to noise ratio. The equalizer in the transmitter avoids this problem.

Functionally there are three main steps to designing and implementing an AutoEQ: 1) the receiver to measure the impulse response of the communication channel; 2) the computation of the compensating inverse filter response; and 3) the actual filter in the transmitter to modify the transmit signal.

Measurement of the impulse response: In particular implementations the modulator is programmed and configured to generate a known pseudorandom noise ("PN") modulated BPSK signal occupying the same bandwidth as the desired modulated signal to measure the impulse response for the communication channel. The receiver uses conventional techniques to demodulate the signal, but also includes a complex PN correlator using the known PN pattern. The output of the correlator is the impulse response of the communication channel, but it is corrupted by noise. However, each time the PN patterns repeat, the result of the computation is mathematically the same except that it contains the uncorrelated noise from the link. By synchronously averaging many of these correlations, the signal to noise ratio may be improved to the point where an accurate, stable impulse response can be computed. It should be noted that other data patterns besides a PN pattern will work. A pattern such as a single "one" followed by s string of "zeros" would work, but the PN sequence results in a more uniform output spectrum.

Computation of the compensating filter with an inverse filter response: In particular implementations the satellite communication system is modeled as a modulated signal with a characteristic impulse response (time response) of S passing through a filter Fe (the equalizer) then passing through a filter Fs (the satellite filter), then being received as a signal that is passed through a Nyquist filter Fn, resulting in a received signal Rrx (the received impulse response). This modeled system can be represented by a simple matrix equation:

$$S*Fe*Fs*Fn=Rrx$$

If there were no uplink degradation (Fs=1) and no equalization (Fe=1), received reference signal could be represented by another simple matrix equation:

$$Rref=S*Fn$$

The difference between Rrx and Rref is the result of Fs. To calculate the impulse response, a value for filter Fe that results in Rrx*Fe=Rref may be calculated. In one particular implementation of the disclosure, the impulse response is calculated iteratively, directly computing FIR coefficients for the leading portion of the impulse response and IIR coefficients for the trailing portion of the impulse response using a weighted difference equation (although other mathematical approaches are available), to force Fe*Fs=1. Weighting may be used to force the most correction for a given step to occur at the zero crossing with less correction provided at the other sample points. This aids in convergence while maintaining the correct spectral output.

Realization of the digital equalizer: Implementations of the digital equalizer circuit may be configured in a variety of different ways depending upon the existing circuitry schemes being configured to include AutoEQ and the needs of a particular application of the equalizer. By non-limiting example, the equalizer for the circuit may be placed in the digital modulator either before or after the Nyquist filter but before modulation as illustrated in the non-limiting example provided in FIG. 4. This makes the equalizer independent of modulator output frequency. Conventional analog equalizers are not capable of equalizing independent of modulator output frequency. The equalizer in the particular implementations shown in FIGS. 3 and 4 each comprise a forward complex FIR digital filter 202 followed by a backward complex IIR digital filter 204. The output of the backward complex IIR filter 204 is fed to a Nyquist filter 206 and then to the modulator 210. Those of ordinary skill in the art will understand how to select and construct the components of the circuit from the block diagrams and descriptions provided.

Figure 5:
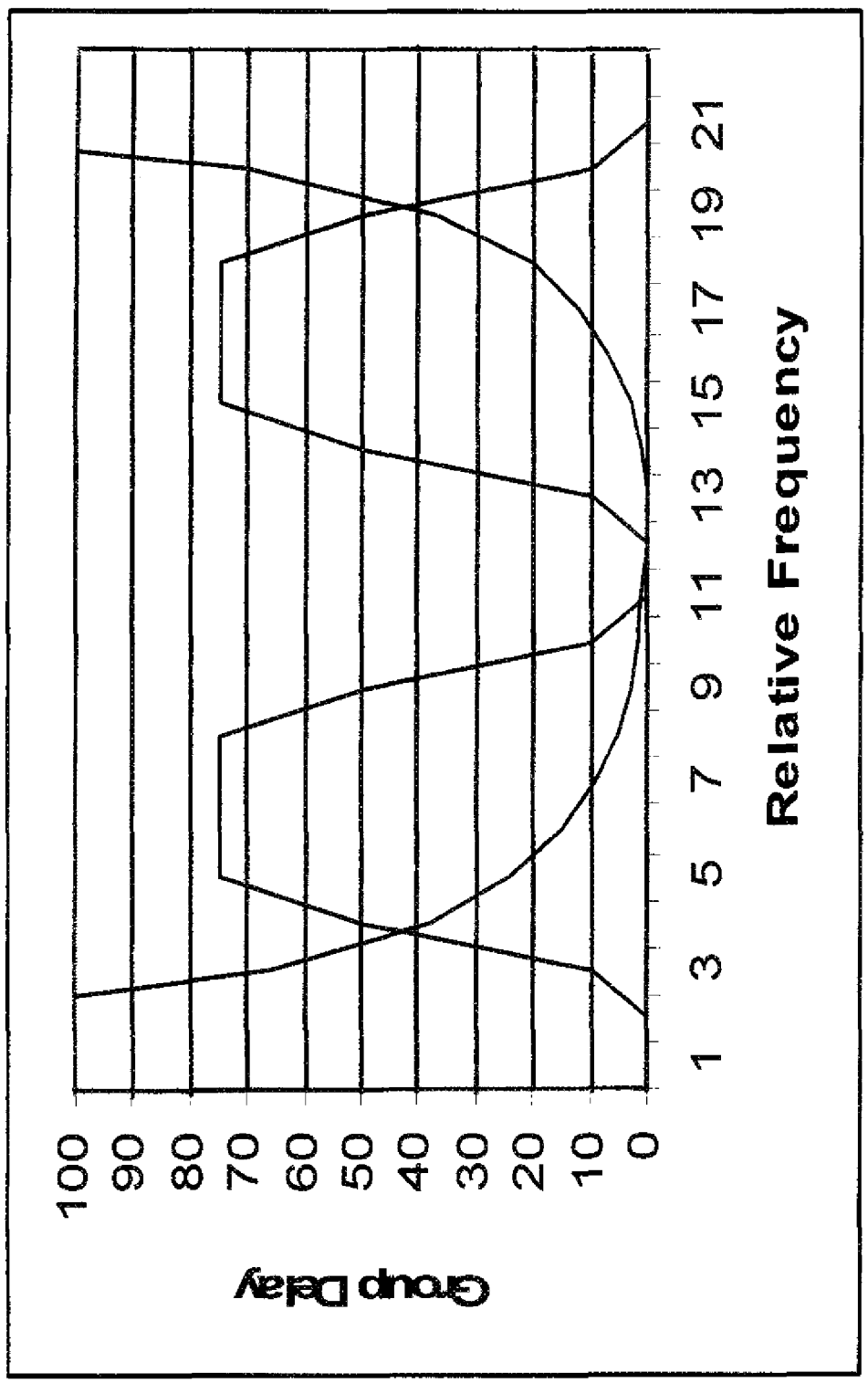
FIG. 5 is a graph illustrating group delay versus relative frequency for multiple carriers on a single transponder system.

All mathematics for the equalizer is performed in complex form to be able to handle non-symmetric amplitude of group delay variation over the bandwidth of interest. Non-symmetric group delay variation may occur when two carriers are placed on a single transponder system as is illustrated through the graph included in FIG. 5.

Figure 4:
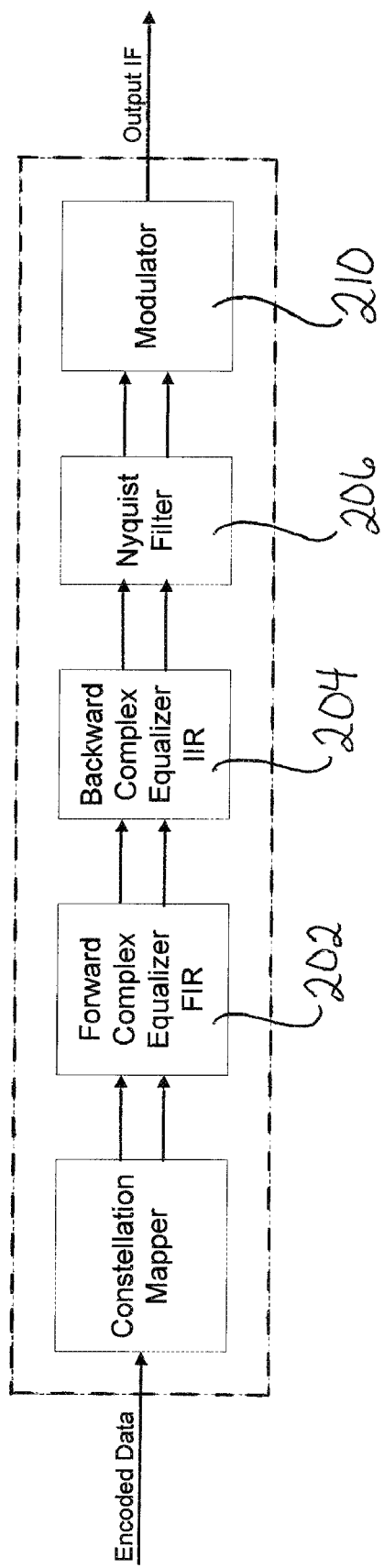
FIG. 4 is a block diagram of a modulator configured according to a particular implementation of the disclosure.

Although the particular non-limiting implementation illustrated in FIG. 3 is configured as an all-in-one equalizer circuit 200, as is further illustrated by FIG. 4 it will be apparent to those of ordinary skill in the art that the functions and components of an AutoEQ equalizer circuit are not required to be in a separate circuit for every implementation and that they may be distributed throughout other existing components in the system or combined with other functions in other adjacent circuits, or portions of the equations may even be pre-calculated as the particular implementation requires. For example, the receiver may be built into the modulator of the transmitter system for measuring transmitter and repeater distortions that are then fed into the modulator to calculate an inverse response. The modulator may then compensate for the distortions which may use a digital equalization performed in the digital domain so it is not dependent on the output frequency of the modulator. Alternatively, a digital receiver may be located at the receive end of the communication system for measuring transmitter and repeater distortions which are communicated to the modulator which then calculates an inverse response. The modulator may then compensate for the distortions which may use digital equalization performed in the digital domain so it is not dependent on the output frequency of the modulator. In yet another alternative, pre-distortion coefficients are calculated ahead of time and uploaded to the modulator to modify the spectral output of the system and compensate for the amplitude versus frequency group delay distortion which may use digital equalization performed in the digital domain so it is not dependent on the output frequency of the modulator.

In the non-limiting example of a satellite communication system configured according to a particular implementation of the disclosure provided in FIG. 3, the received signal is sampled by the AutoEQ receiver 300 receives amplitude and phase distortion information through the receiver system after the received signal has been received from the satellite antenna 153, but before the L-band signal is demodulated at demodulator 178. The signal is processed at receiver microprocessor 302 before being fed to the forward complex FIR digital filter 202 with the digitally processed data input signal 100. The equalizer circuit calculates the amplitude versus frequency group delay correction pre-distortion coefficients and pre-distorts the carrier signal consistent with the pre-distortion coefficients.

Figure 6A:
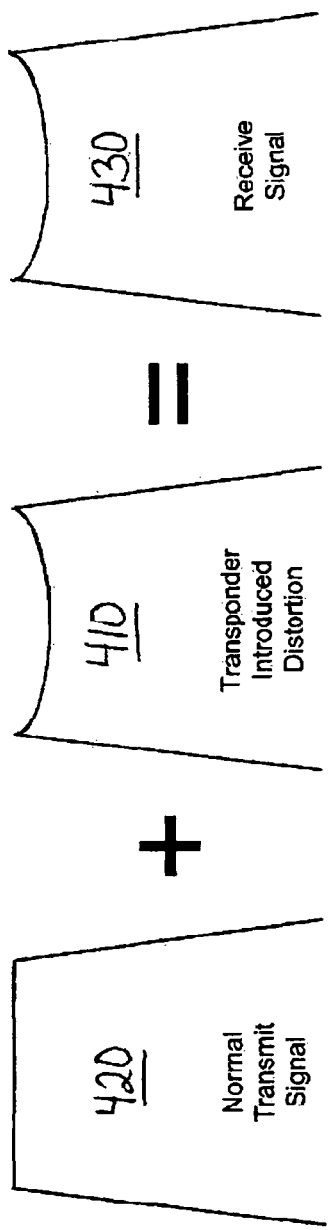
FIGS. 6A and 6B schematically illustrate receive signals through a conventional satellite communication system and a satellite communication system configured with a pre-distortion process.
Figure 6B:
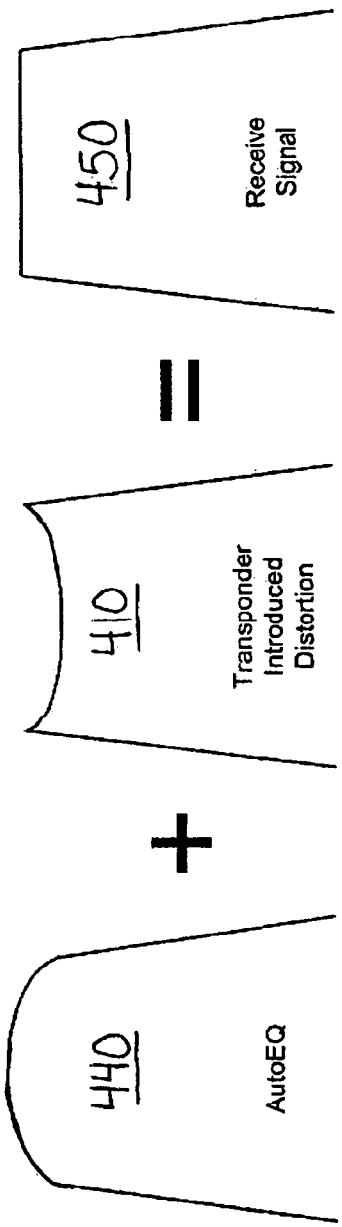

FIGS. 6A and 6B schematically illustrate a comparison between a receive signal in a conventional satellite communication system (FIG. 6A) and a receive signal resulting through a satellite communication system modified with a pre-distortion process configured according to a particular implementation of the disclosure (FIG. 6B). In FIG. 6A, a transponder induced distortion 410 is added to the normal transmit signal 420 when it is received as the conventional receive signal 430. The received signal 430 is used as the basis for determining the desired carrier group delay. Normal transmit signal 420 is equalized by the AutoEQ processed signal 440 to pre-distort the transmit signal, resulting in a much better quality receive signal 450. By pre-distorting the signal with the opposite phase and amplitude as the uplink distortion, the negative effects of the transponder and satellite distortion can be eliminated.

TEST EXAMPLES

Figure 7:
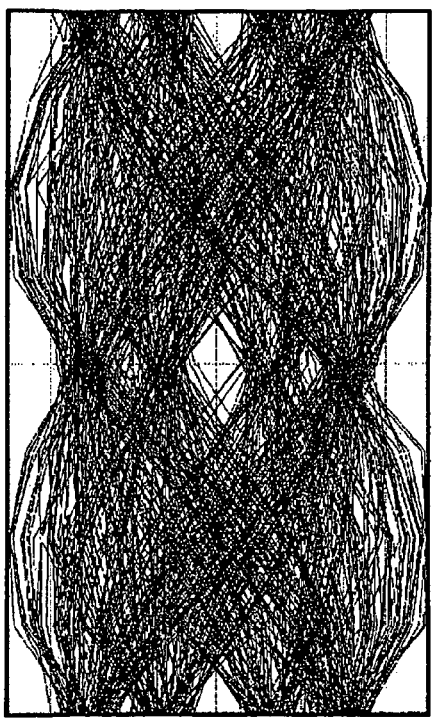
FIG. 7 illustrates a representation of received signals through a conventional satellite communication system such as that illustrated in FIG. 1 modulated by 8 PSK at 30 Msps.
Figure 8:
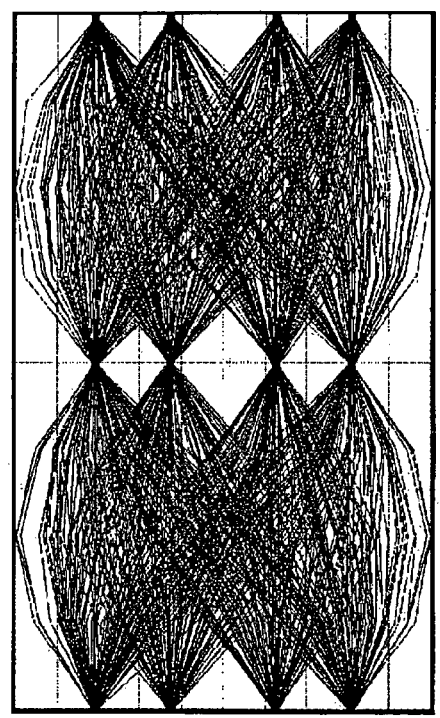
FIG. 8 illustrates a representation of the received signals shown in FIG. 5, but processed according to a satellite communication system configured according to an implementation of the disclosure.

FIG. 7 illustrates conventional satellite communication system received signals modulated by 8 PSK (phase shift keying) at 30 Msps. Specifically, FIG. 7 illustrates pre-equalization eye-pattern distortion. In contrast, FIG. 8 illustrates the received signals of FIG. 7 processed with an automatic equalizer consistent with an implementation of the disclosure. A comparison of FIGS. 7 and 8 illustrates the significance of auto-equalization according to the implementations disclosed herein.

Figure 9:
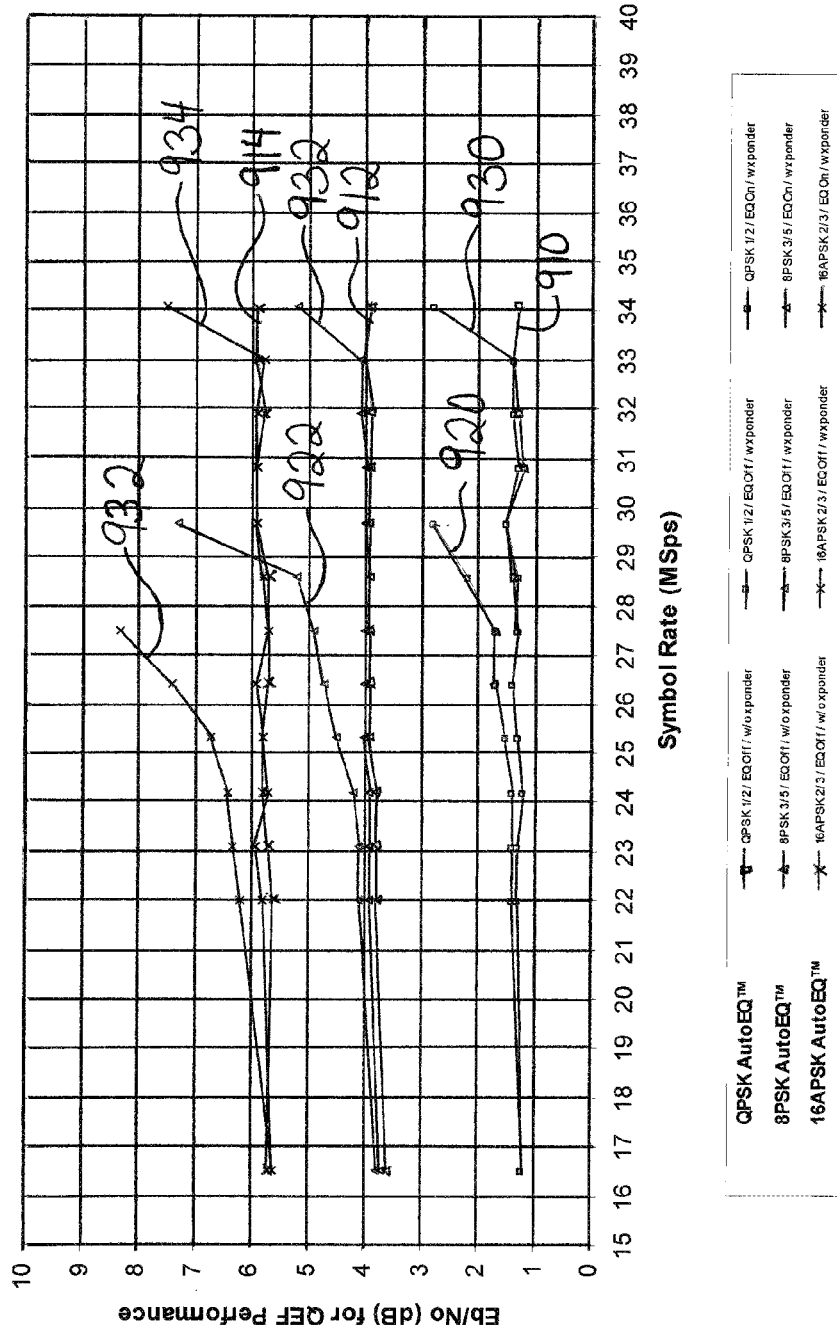
FIG. 9 is a graph illustrating a performance comparison of a modulator and demodulator with no degradation, a conventional transponder without an equalizer and a conventional transponder with equalization configured according to a particular implementation of the disclosure for various types of modulation.

FIG. 9 illustrates an example of a performance improvement achieved using AutoEq for 3 types of modulation compared to the performance of a typical transponder system. The baseline curves of the modem performance without a transponder are the best that can be attained in a conventional satellite communication system. The curves without AutoEQ illustrate the degradation the typical transponder causes for QPSK, 8 PSK and 16 PSK carrier examples, respectively. The first lines 910, 912 and 914 on each example represents the ideal performance curve with no transponder or equalizer at all for each of the respective examples. The second lines 920, 922 and 924 on each respective example represents performance with the AutoEQ amplitude and group delay versus frequency correction turned off. The third line 930, 932 and 934 on each respective example represents performance with the AutoEq turned on. The curves with AutoEQ turned on show the performance improvement that AutoEQ provides, nearly matching the best attainable result from the modem nearly to the limits of the transponder system frequency range.

The embodiments described herein are exemplary and non-limiting. The scope of the disclosure is defined solely by the appended claims when accorded a full range of equivalence with many variations and modifications naturally occurring to one of ordinary skill in the art without departing from the scope of the claims.

What is claimed is:

1. An automatic equalizing circuit and system for a closed-loop satellite communication system comprising:
    a transmitter system configured to receive a digital data input signal and send a transmit signal to a satellite in space;
    a satellite repeater at the satellite configured to receive the transmit signal, process the transmit signal and send the processed signal toward Earth;
    a receiver system on Earth configured to receive the processed signal from the satellite repeater; and
    an automatic equalizer on Earth between the receiver system and the transmitter system, the automatic equalizer comprising at least a backward complex infinite impulse response (IIR) filter and a forward finite impulse response (FIR) filter in series with a Nyquist filter, the automatic equalizer configured to:
  measure an impulse response of a communication channel from the signal received by the receiver system, the communication channel comprising at least the transmitter system and the satellite repeater;
  calculate an inverse filter response for the communication channel based on the impulse response; and
  digitally modulate the digital data input signal with the inverse filter response in the digital domain to pre-distort the digital data input signal before it is sent by the transmitter system.

2. The automatic equalizing circuit and system of claim 1, wherein the automatic equalizer comprises a modulator programmed to generate a known pseudorandom noise signal having a bandwidth substantially equal to the digital data input signal and pass the known pseudorandom noise signal through the communication channel to measure the impulse response of the communication channel.

3. The automatic equalizing circuit and system of claim 1, wherein the automatic equalizer is configured to pre-distort the digital data input signal to compensate for amplitude versus frequency group delay by positioning the automatic equalizer in the receiver system.

4. The automatic equalizing circuit and system of claim 1, wherein the automatic equalizer is configured to pre-distort the digital data input signal to compensate for amplitude and group delay versus frequency by passing the digital data input signal through a forward complex finite impulse response (FIR) filter in series with a backward complex infinite impulse response (IIR) filter either before or after a series Nyquist filter before passing the digital data input signal to a modulator in the transmitter system.

5. The automatic equalizing circuit and system of claim 4, wherein the automatic equalizer is configured to calculate a plurality of pre-distortion coefficients for a leading portion of the impulse response and then pass those coefficients to the forward complex finite impulse response (FIR) filter, and to calculate a plurality of pre-distortion coefficients for a trailing portion of the impulse response and then pass those coefficients to the backward complex infinite impulse response (IIR) filter.

6. The automatic equalizing circuit and system of claim 1, wherein the automatic equalizer is configured to equalize independent of an output frequency of a modulator for the transmitter system.

7. The automatic equalizing circuit and system of claim 6, wherein the automatic equalizer comprises a forward complex finite impulse response (FIR) filter in series with a backward complex infinite impulse response (IIR) filter that is coupled in series with a Nyquist filter before being coupled to the modulator for the transmitter system.

8. The automatic equalizing circuit and system of claim 1, wherein pre-distortion coefficients for the impulse response are pre-calculated for the communication channel and stored in association with the automatic equalizing circuit.

9. A method of automatically equalizing a communication channel for a satellite communication system, the method comprising:
  measuring an impulse response of a communication channel from a signal received by a receiver system, the communication channel comprising at least a transmitter system on Earth and a satellite repeater in space;
  calculating an inverse filter response for the communication channel based on the impulse response; and
  digitally modulating a digital data input signal for the transmitter system with the inverse filter response in the digital domain to pre-distort the digital data input signal before it is sent by the transmitter system to the satellite repeater by passing the digital data input signal through a forward complex finite impulse response (FIR) filter in series with a backward complex infinite impulse response (IIR) filter either before or after a series Nyquist filter before passing the digital data input signal to a modulator in the transmitter system.

10. The method of claim 9, wherein measuring the impulse response of the communication channel comprises generating a known pseudorandom noise modulated binary phase shift keyed signal having a bandwidth substantially equal to the digital data input signal and passing the known pseudorandom noise modulated binary phase shift keyed signal through the communication channel.

11. The method of claim 9, wherein calculating the inverse filter response comprises calculating a plurality of pre-distortion coefficients for a leading portion of the impulse response and passing those coefficients to the forward complex finite impulse response (FIR) filter, and calculating a plurality of pre-distortion coefficients for a trailing portion of the impulse response and then passing those coefficients to the backward complex infinite impulse response (IIR) filter.

12. The method of claim 11, wherein pre-distortion coefficients for at least one of the leading portion and the trailing portion of the impulse response are pre-calculated for the communication channel and stored in association with an automatic equalizing circuit located between and in communication with a receiver system and a transmitter system.

13. The method of claim 11, wherein measuring the impulse response of the communication channel comprises, before calculating the plurality of pre-distortion coefficients, generating a known pseudorandom noise modulated binary phase shift keyed signal having a bandwidth substantially equal to the digital data input signal and passing the known pseudorandom noise modulated binary phase shift keyed signal through the communication channel.

14. The method of claim 9, further comprising equalizing the communication channel independent of an output frequency of the communication channel.

15. A method of pre-distorting a digital data input to a modulator for a satellite communication system, the method comprising:
  receiving a digital data input for a satellite communication system at a digital processor and then at an automatic equalizer coupled between a transmitter system and a receiver system of a communication channel for the satellite communication system, the communication channel comprising at least a transmitter system on Earth and a satellite repeater in space;
  receiving a received satellite signal passed from the receiver system at the automatic equalizer;
  passing an output of the automatic equalizing circuit to a modulator of the transmitter system; and
  automatically equalizing the communication channel in the digital domain independent of an output frequency of the communication channel by passing the digital data input signal through a forward complex finite impulse response (FIR) filter in series with a backward complex infinite impulse response (IIR) filter either before or after a series Nyquist filter before passing the digital data input signal to the modulator of the transmitter system.

16. The method of claim 15, further comprising, within the automatic equalizer:
  measuring an impulse response of the communication channel from the received satellite signal;

calculating an inverse filter response for the communication channel based on the impulse response measured; and digitally modulating the digital data input signal for the transmitter system with the inverse filter response in the digital domain to pre-distort the digital data input signal before it is sent by the transmitter system to the satellite repeater.

17. The method of claim 15, wherein calculating the inverse filter response comprises calculating a plurality of pre-distortion coefficients for a leading portion of the impulse response and passing those coefficients to the forward complex finite impulse response (FIR) filter, and calculating a plurality of pre-distortion coefficients for a trailing portion of the impulse response and then passing those coefficients to the backward complex infinite impulse response (IIR) filter.

18. The method of claim 17, further comprising pre-calculating the pre-distortion coefficients for at least one of the leading portion and the trailing portion of the impulse response and storing the pre-distortion coefficients in the automatic equalizer.

19. The method of claim 17, wherein measuring the impulse response of the communication channel comprises generating a known pseudorandom noise modulated binary phase shift keyed signal having a bandwidth substantially equal to the digital data input signal and passing the known pseudorandom noise modulated binary phase shift keyed signal through the communication channel.

* * * * *